US006260255B1

(12) United States Patent
Richardson et al.

(10) Patent No.: US 6,260,255 B1
(45) Date of Patent: Jul. 17, 2001

(54) METHOD OF ASSEMBLING A DISPLAY CASE DOOR

(75) Inventors: Richard J. Richardson, Simi Valley; Charles E. Crown, San Fernando, both of CA (US)

(73) Assignee: Anthony, Inc., San Fernando, CA (US)

( * ) Notice: Subject to any disclaimer, the term of this patent is extended or adjusted under 35 U.S.C. 154(b) by 0 days.

(21) Appl. No.: 09/262,125

(22) Filed: Mar. 3, 1999

Related U.S. Application Data

(63) Continuation of application No. 09/034,548, filed on Mar. 3, 1998.

(51) Int. Cl.[7] ...................................................... B23P 25/00
(52) U.S. Cl. ............................ 29/458; 49/501; 52/786.13
(58) Field of Search ................................ 29/458; 49/501, 49/505, 506, DIG. 2; 52/786.11, 786.13

(56) References Cited

U.S. PATENT DOCUMENTS

| | | | | |
|---|---|---|---|---|
| Re. 35,149 | * | 1/1996 | Richardson et al. | 52/786.13 |
| Re. 35,392 | * | 12/1996 | Richardson et al. | 52/786.13 |
| 3,426,482 | | 2/1969 | Mock . | |
| 3,499,245 | | 3/1970 | Winsler et al. | 49/70 |
| 3,843,982 | | 10/1974 | Lane et al. | 114/361 |
| 3,866,373 | | 2/1975 | Hudock . | |
| 3,924,373 | | 12/1975 | Lizdas et al. . | |
| 3,949,526 | | 4/1976 | Sherlock et al. . | |
| 4,004,370 | | 1/1977 | Heaney | 49/70 |
| 4,024,690 | | 5/1977 | Collins et al. . | |
| 4,290,233 | | 9/1981 | Hubbard . | |
| 4,588,235 | | 5/1986 | Barroero . | |
| 4,741,127 | | 5/1988 | Bockwinkel | 49/501 |
| 4,753,043 | | 6/1988 | Bockwinkel | 49/501 |
| 4,821,476 | | 4/1989 | Thoburn et al. . | |
| 4,831,780 | | 5/1989 | Bockwinkel | 49/504 |
| 4,852,303 | | 8/1989 | Rolek | 49/504 |
| 4,924,631 | | 5/1990 | Davies et al. . | |
| 4,998,382 | | 3/1991 | Kostos et al. | 49/501 |
| 4,999,958 | | 3/1991 | Harrison . | |
| 5,024,023 | | 6/1991 | Kostos et al. | 49/504 |
| 5,035,085 | | 7/1991 | Mameson et al. . | |
| 5,097,642 | | 3/1992 | Richardson et al. | 52/171.1 |
| 5,099,624 | * | 3/1992 | Valentin . | |
| 5,107,655 | * | 4/1992 | Lingden | 52/786.11 |
| 5,111,618 | | 5/1992 | Kaspar et al. | 49/501 |
| 5,113,628 | | 5/1992 | Richardson et al. | 52/171.3 |
| 5,199,234 | * | 4/1993 | Guhl . | |

(List continued on next page.)

FOREIGN PATENT DOCUMENTS

| | | | |
|---|---|---|---|
| 29 08 541 | | 9/1979 | (DE) . |
| 35 43 524 A1 | | 6/1987 | (DE) . |
| 0 124 397 | * | 11/1984 | (EP) . |
| 0 228 641 | | 7/1987 | (EP) . |
| 2 572 766 | * | 9/1986 | (FR) . |
| 1 482 372 | | 8/1977 | (GB) . |
| RE 92U00033 | * | 4/1992 | (IT) . |

*Primary Examiner*—P. W. Echols
*Assistant Examiner*—Jermie E. Cozart
(74) *Attorney, Agent, or Firm*—Henricks, Slavin & Holmes

(57) ABSTRACT

A refrigerator door is described for a refrigerated display case. The door includes a glass unit having first and second spaced apart glass panels where the first panel has a forward facing surface and the second panel has a rearward facing surface. A spacer element extends between the first and second glass panels. The door relevant includes an external perimeter wall extending from front to back from a point adjacent the edge of the forward glass panel to a point adjacent the rearward glass panel. A second frame element wall extends between the first and second spaced apart glass panels and extends externally out of the spaced apart glass panels to the perimeter wall. The door rail element also includes a rear wall portion extending inwardly toward the center of the door from the perimeter wall and over a portion of the rearward facing surface of the second glass panel.

18 Claims, 7 Drawing Sheets

U.S. PATENT DOCUMENTS 5,212,921 * 5/1993 Unruh .
5,228,240 7/1993 Barroero et al. ........................ 49/386
5,255,473 10/1993 Kaspar et al. .......................... 49/501
5,280,686 * 1/1994 Davies .
5,290,611 * 3/1994 Taylor .
5,363,611 11/1994 Richardson et al. ................. 312/116
5,371,987 * 12/1994 Hirsch et al. .
5,435,106 * 7/1995 Garries et al. .
5,448,869 * 9/1995 Unruh et al. .
5,544,454 8/1996 Richardson et al. ................ 52/171.1
5,910,083 6/1999 Richardson et al. ................ 52/171.1

* cited by examiner

METHOD OF ASSEMBLING A DISPLAY CASE DOOR

CROSS REFERENCE TO RELATED APPLICATIONS

This application is a Continuation of application Ser. No. 09/034,548, filed Mar. 3, 1998 still pending.

BACKGROUND OF THE DISCLOSURE

1. Field of the Invention

This invention relates to display case doors and more specifically to commercial refrigerator display case doors, such as those used in grocery stores, convenience stores, and other grocery and product display environments.

2. Related Art

Conventional commercial refrigerator doors serve multiple functions. For example, the doors preferably provide a maximum viewing area for customers to view product. The doors also permit customers to open them to select and retrieve desired product from the display. The doors also seal the openings in the display cabinet to minimize the possibility of energy loss, while still preferably providing a low-profile, and a maximum viewing area. The door is preferably sufficiently strong and relatively rigid to withstand the impacts and effects of heavy use, such as any twisting, torquing, and other effects of constant opening and closing. The door also preferably includes a glass unit for providing the viewing area along with a suitable frame for protecting the glass unit from the effects of impact, and for mounting various hardware such as a handle, hinge mechanisms, and a door hold-open. A refrigerator door may also include heater wires for keeping the door frame relatively warm, compared to the cold compartment, to minimize the possibility of condensation forming on the frame.

Conventional refrigerator doors have achieved the appearance of maximum viewing area by providing an all-glass front. For example, the front and rear panels of glass can sandwich all or part of the door frame so that the forward panel is fully exposed, and not covered by any part of the door frame. In this design, the frame is at least partly internal to the glass unit and is covered for esthetic and protection purposes by a plastic shroud or cover. However, the additional components beyond a simple door frame typically add cost and manufacturing time for the door.

Other approaches to an all-glass front door include molding a frame around a glass unit, while leaving the forward glass panel exposed. Molding a door including set up time is also a time-intensive process and requires significant attention to insure proper positioning of the frame prior to molding.

SUMMARY OF THE INVENTION

A door is provided which reduces the time, space and labor necessary for assembling a door and which is easy to manufacture. The door also provides better thermal characteristics as well as an improved appearance.

An improved display door is provided with a glass unit and a spacer element extending between the panels of the glass unit. The door also includes at least one door rail element extending between the panels and also externally of the panels to form a perimeter wall for the door. This design provides easier manufacture, shorter manufacturing time, and reduced space requirements for assembly.

In one preferred embodiment, the door is formed with door rail elements made of a composite of fiber glass or other glass mats and rovings embedded in a thermoplastic resin. With the door rail element or elements formed from a composite material, the number of required parts can be significantly reduced, and the thermal characteristics of the resulting door are substantially improved. Moreover, in some environments, the conventional heating of the door frame to reduce or minimize vapor condensation can be entirely eliminated. The door rail elements can be efficiently manufactured by producing the rail elements as lineal sections followed by routing or other processing in order to make the door rail elements suitable for assembly with a glass unit as a door.

In a further form of the invention, door rail elements can be formed of a composite material having hollow frame elements extending between spaced apart glass panels. The hollow frame element not only provides support for the glass panels but also provides insulation in the form of an air pocket reducing heat transfer between the spaced apart glass panels. The composite rail element may also have a cover portion or flange portion that extends inwardly over a rearwardly facing portion of a rear most glass panel. The flange portion may include an arrangement such as a groove for accepting a sealing gasket. The flange may also be formed so as to include an air pocket between the rearward most glass panel and the flange portion to provide enhanced thermal insulation between the cold portion of the door and the outside environment.

In other embodiments, the frame portion extending between the glass panels includes projections for engaging sealant inserted between the glass panels for sealing the glass unit and for fixing the frame elements relative to the glass unit. Those projections preferrably includes circumferential ridges or other discontinuities for engaging the sealant.

An improved method of constructing or assembling a display door includes the steps of assembling a glass unit with two or more glass panels and spacer bars separating the glass panels. Pairs of rail elements are joined with corner keys and sealant is applied around the spacers and between the glass panels to seal the glass unit and to provide an anchor for the frame. Sealant is also preferrably placed in a groove in the frame elements into which the edge of the rearward most glass panel will be inserted. Two pairs of frame elements are then brought together and assembled with respective corner keys about the glass unit to set up the door. Where the door is a rectangular door, a band or a clamp can be placed around the center of the long dimension of the door, but such clamping or binding is not believed to be necessary, especially where the frame elements are formed from a composite material such as fiber glass embedded thermoplastic.

In a preferred embodiment, the door rail elements include perimeter wall elements which extend forward no further than the forward facing surface of the forward glass panel, to provide an all-glass front appearance. Preferrably, a cushion or tip extends between the perimeter edge of the forward glass panel and the adjacent perimeter wall portion so that the cushion can help to register or properly position the frame elements around the forward glass panel. Proper registration ensures alignment between the frame elements and the glass panel and proper appearance. Additionally, applying sealant to the groove for the rearward most glass panel allows adjustment for variations in glass shape or size in the rearward most glass panel. Therefore, upon assembly, the sealant and the spacing in the groove can easily accommodate variations in the rear glass panel while still permitting proper registration and fit between the forward glass panel and the door rail elements.

These and other benefits of the invention will become apparent upon consideration of the drawings, a brief description of which follows, and the detailed description of the preferred embodiments following.

DETAILED DESCRIPTION OF THE PREFERRED EMBODIMENTS

A refrigerator door is described in the preferred embodiment which reduces the time, space and labor necessary for assembling a door. The door is easier to manufacture, provides better thermal characteristics and has an improved appearance over many conventional refrigerator doors. The preferred refrigerator door permits more flexibility in aligning the door frame elements with the glass unit, and consolidates several components of previous door designs into a single element, thereby reducing cost and labor. The preferred refrigerator door also has a pleasing appearance, and can be used to produce a refrigerator door having an all-glass appearance. The following description will be of the preferred embodiments of the inventions, and the claims should not be limited to those preferred embodiments. The preferred embodiments are intended to be illustrative of several examples of the invention, and should not be considered to be exclusive of other designs accomplishing functions or results achieved by the present invention.

Figure 1:
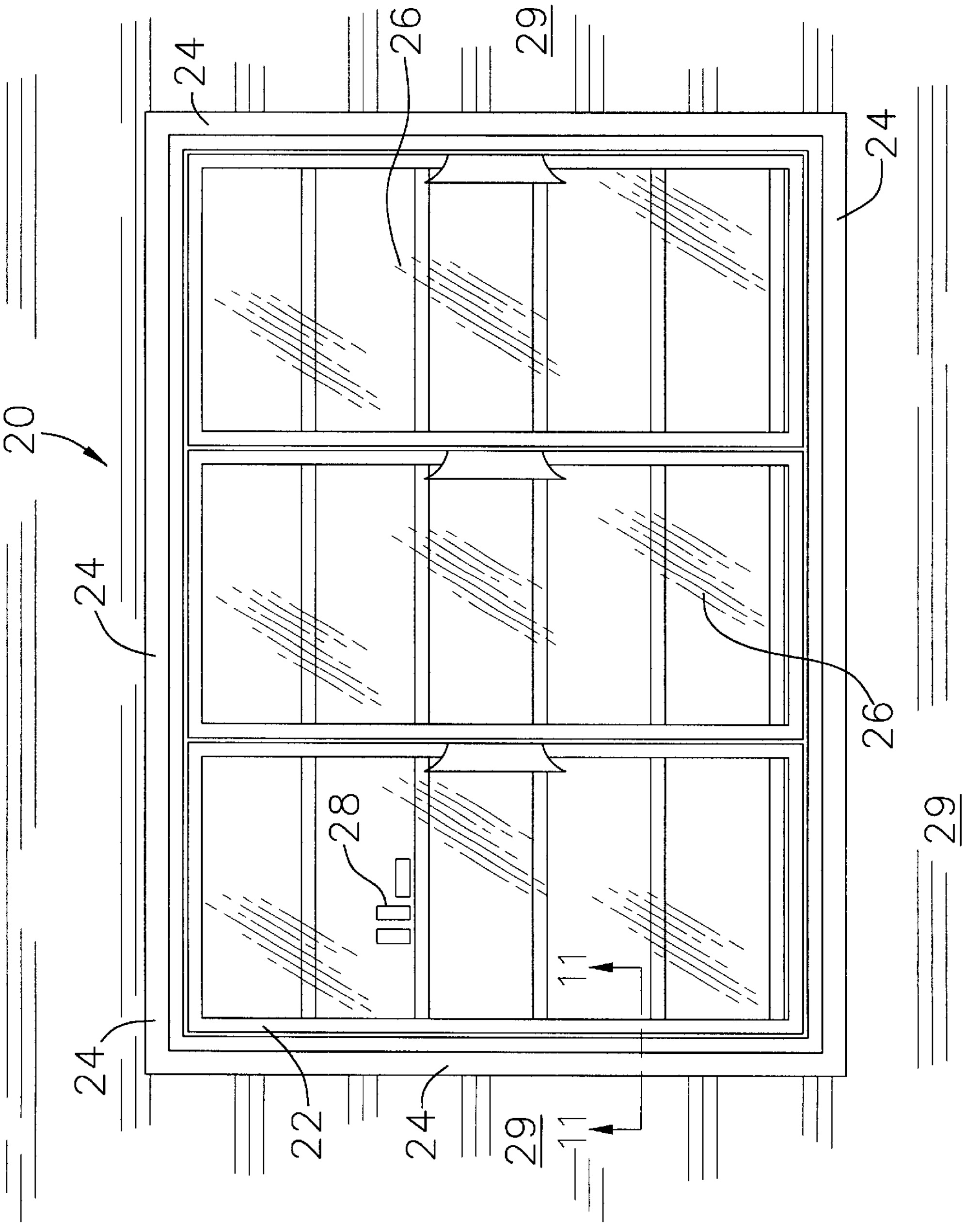
FIG. 1 is an elevational view of a display case with which the present inventions may be used, having doors mounted thereon and shelves mounted inside the display case.

In one preferred embodiment of the invention, the door and frame rail elements may be used with a display case 20, having doors 22 mounted on the surrounding frame 24. The doors 22 have glass panels 26 to allow a customer such as one in a supermarket, or other person to look through the glass panels 26 at products or items 28 (FIG. 1). For more information about display cases and their structures, functions and features, see the published application, publication No. WO 95/16375, the text and drawings of which are incorporated herein by reference. The display case may be mounted in a wall, may be a freestanding unit, or may take any other appropriate configuration. The wall or sides of the opening defining the opening, or other frame members thereof, are generally designated at 29. Typically, the surrounding frame 24 sets into the opening defined by the wall, or by the top, bottom and sides of a free-standing unit.

Figure 2:
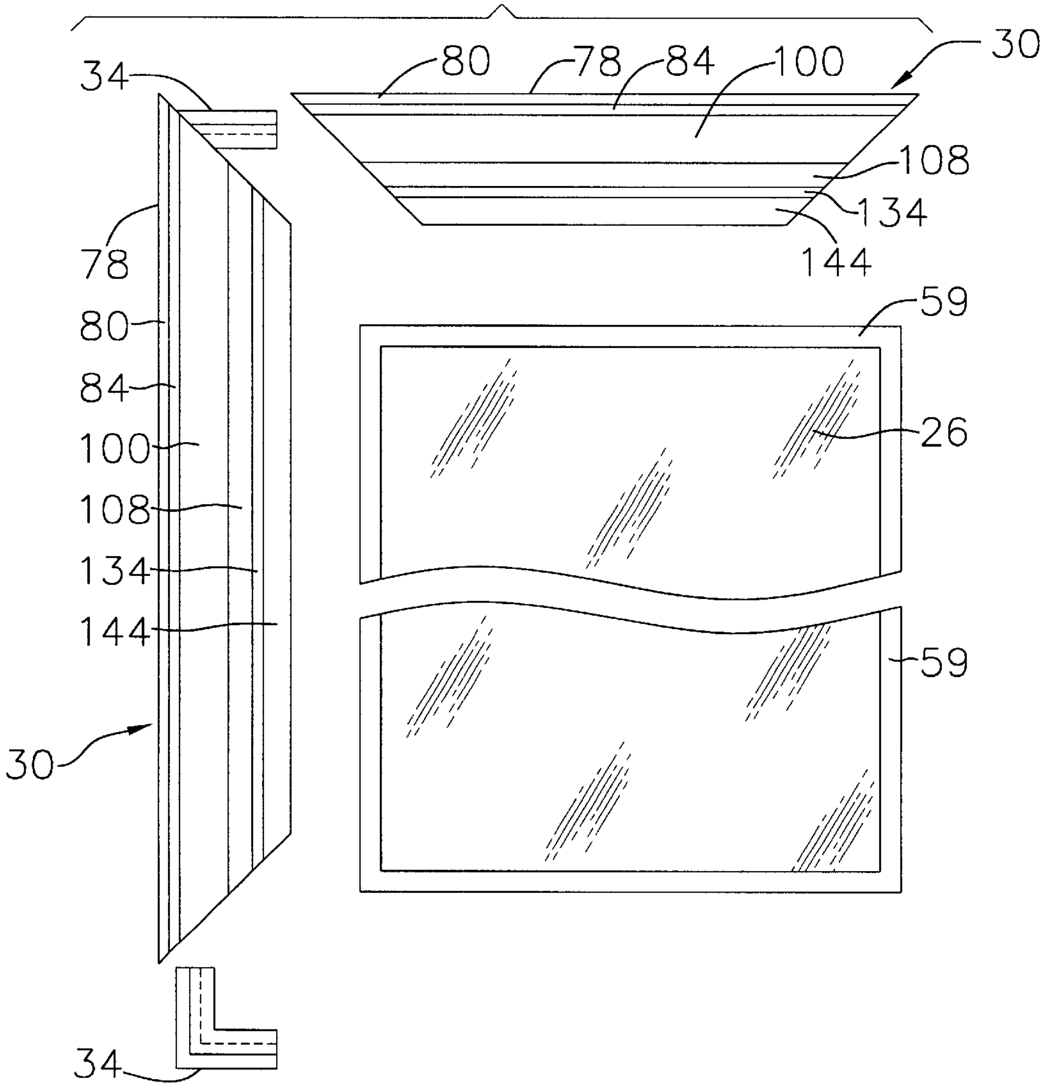
FIG. 2 is an exploded plan view of a door in accordance with one aspect of the present inventions.

The door 22 preferably includes four mitered door rail elements 30 (two of which are shown in FIG. 2) assembled into a rectangular door frame holding or otherwise supporting the panels 26. In the embodiment shown in FIG. 2, the panels 26 are a sealed pack of three glass panes separated by spacers, as is known to those skilled in the art. The glass pack may be formed and assembled in any number of ways for use in the door 22, considering the preferred structure of the frame described more fully below.

Figure 5:
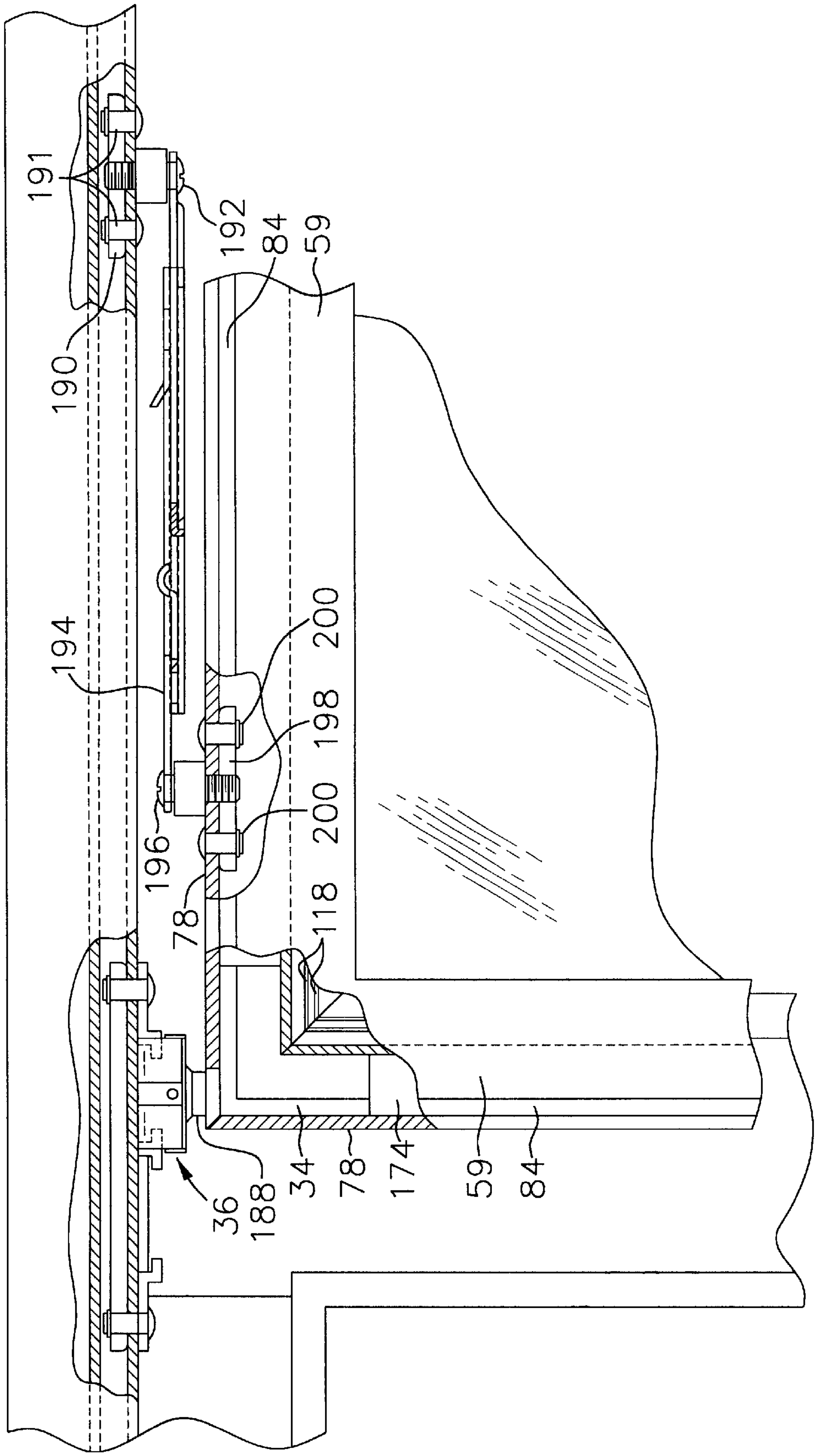
FIG. 5 is an elevation view and partial cut-a-way of a frame and door assembly showing attachment of hardware.

The individual door rail elements are joined at their respective corners by corner key elements 34 (FIGS. 2 and 5). The corner key elements may be formed in a number of ways, but are preferably formed of a lightweight material compatible with the pultruded door rail elements. The corner keys on the hinged side of the door are formed so as to accept hinged elements 36 which may have the form and structure of the hinge and connector element and/or the door closure element shown in U.S. Pat. Nos. 4,671,582 and 4,696,078.

The door rail elements are preferably formed as linear elements (lineal) and cut and mitered to length according to the desired dimensions for the door. The cut edges can be finished as desired prior to assembly. Using the same profile of door rail element for all four sides of the refrigerator door is preferred, as being more cost-effective, by reducing inventory, training requirements and assembly time. Additionally, use of common elements reduces the possibility of mismatch and improper installation. Therefore, the description herein of the door rail elements treats the entire length of the door rail elements as having the same cross-section or profile, unless otherwise indicated. Once the doors are assembled with the corner keys and door rail elements fastened together and sealed with sealant to the glass unit, the door can be used in a refrigerated display case. The door provides an openable closure across an opening in the refrigerated display case to permit viewing of product inside the case and to permit customers or others to reach in the case, select an item and remove it for purchase or inspection. Multiple doors can be included on one display case, as is known, and they can be mounted, supported and controlled by various supplemental equipment or accessories, such as hinges, handles, hold-open units and shock absorbers, and the like. Some of these will be described more fully below.

The door also preferably includes a sealing gasket 38 and can be any conventional sealing gasket known to those skilled in the art. The sealing gasket is mounted on or to the inside face of the door rail elements, such as in a gasket groove 40, described more fully below. One preferred sealing gasket shown includes an additional amount of material adjacent the magnetic strip to increase thermal insulation.

Considering the preferred door in more detail (FIGS. 3 and 4), the door preferably includes a glass unit including at least first and second spaced apart glass panels 42 and 44, respectively, wherein the first panel has a forward facing surface 46 and the second panel has a rearward facing surface 48. The first panel 46 will also be referred to as the forward panel or forward-most panel, and the second glass panel 44 will also be referred to as the rearward or rearward-most panel. In the preferred applications, the forward- and rearward-most panels are preferably identically sized and assembled so that the adjacent edges of each panel are flush and co-planar. The forward and rearward panels can be selected from panels of the same or different thicknesses, and they may be identically treated, or the forward panel can also include an infrared reflective coating or an electro-conductive coating. Alternatively, the forward and/or the other panels can include the same features.

In a two panel door, the forward facing surface 46 of the forward glass panel is also referred to as the number one surface, and the inside surface of the forward glass panel is also referred to as the number 2 surface. The interior surface 54 of the rearward panel 44 is referred to as the No. 3 surface, and the rearwardly facing surface 48 is referred to as the number four surface. In an all glass front door, the No. 1 surface of the forward panel preferably defines the forward most surface of the entire door.

Figure 4:
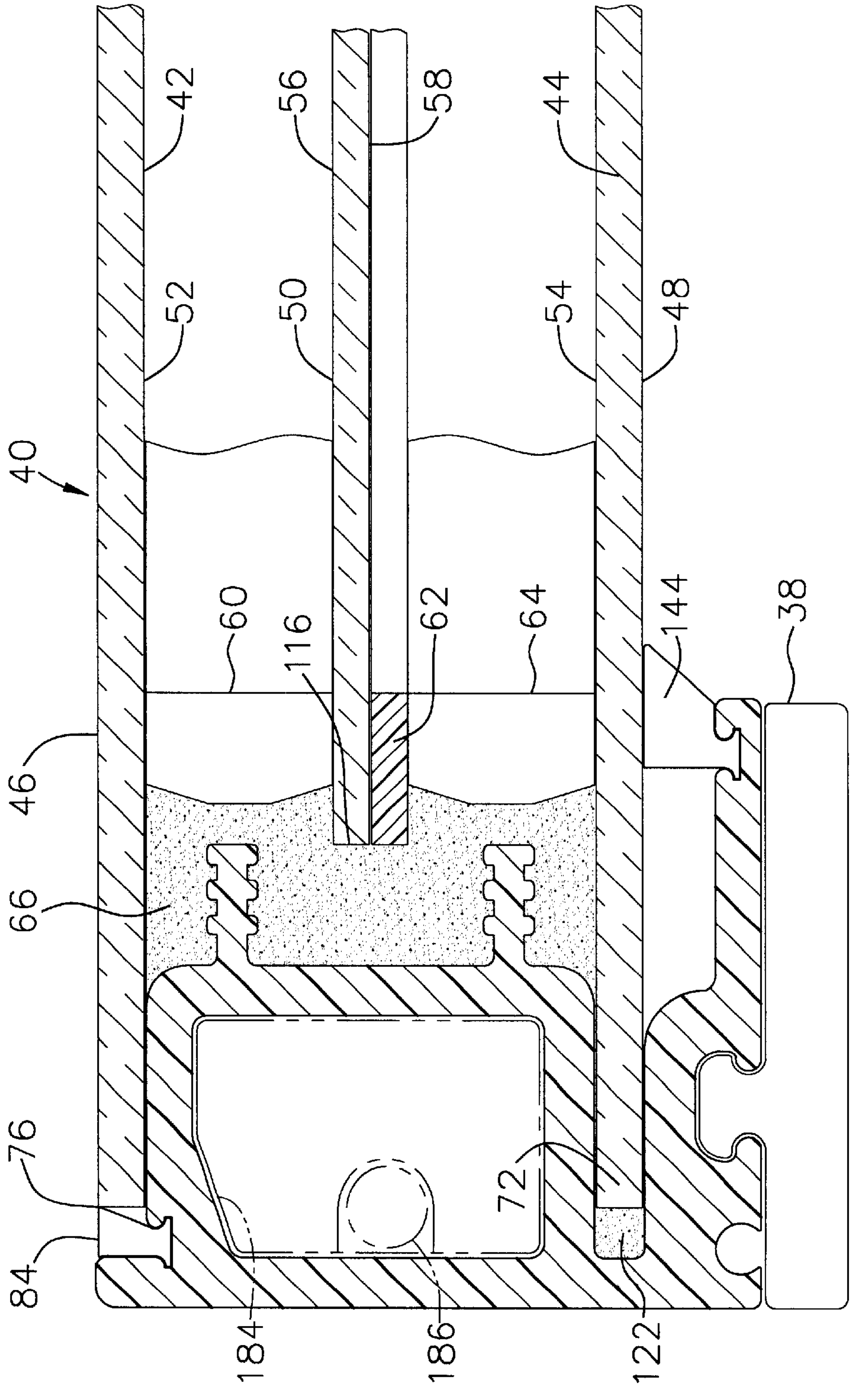
FIG. 4 is a cross-sectional view of a portion of a door in accordance with a further aspect of the present inventions.

The refrigerator door may also have three or more panels, FIG. 4 showing a three panel configuration. The third panel 50 includes a forwardly facing surface 56, also termed the No. 3 surface in a three panel door, and a rearwardly facing surface 58, also termed the No. 4 surface in a three panel door. The description of a refrigerator door herein will be made in the context of a three panel door, it being understood by those skilled in the art that doors with fewer or greater panels can also be made with the benefits and features of the inventions described herein.

The glass unit or glass pack of a three panel door may be assembled prior to or at the same time as the frame components are partly assembled. In one preferred embodiment, the forward glass pane is placed flat on a surface with two adjacent edges placed against respective guide edges or registration points on a table or other surface. The rearwardly facing surface 52 of the front panel may also include a mask or frit 59 (FIGS. 2 and 5) extending as a border about the rearwardly facing perimeter surface of the forward glass pane to mask or hide any glass unit or frame structural components. A first frame or rectangular assembly of spacers 60 is placed on the No. 2 surface of the forward panel 42, preferably over the interior edge of the mask. The spacer assembly 60 may be placed directly on the frit or may be adhered to the frit by a double backed adhesive tape. The third panel or intermediate panel 50 is then placed over the spacer assembly 60 so that the peripheral edges of the intermediate panel 50 extend out to or slightly beyond the external peripheral edges of the spacer assembly 60. Preferably, an intermediate panel locator guide or frame (not shown) is placed around the same sides of the glass unit as the panel locating keys or guide edges for the forward panel are located. The locator guide preferably positions the intermediate panel relative to the spacer assembly 60 and to the outer perimeter edges of the forward panel 42 so that the forward and intermediate panels are square relative to each other.

Either before or after the intermediate panel 50 is placed on the spacer assembly 60, a neoprene or similar plastic or rubber material having double sided adhesive is placed over a rearwardly facing perimeter surface of the intermediate panel 50. The neoprene is formed as a longitudinal strip extending along a rearward facing surface of the intermediate glass panel and preferably has a width slightly larger than the width of a spacer. The neoprene is applied as strips 62 to seal and also to possibly cushion the portion of the glass unit between the intermediate panel 50 and a second spacer assembly 64, described below. The neoprene also acts as an electrical insulator between any coating on the rearward surface of the intermediate panel 50 and the spacer assembly.

The second spacer assembly 64, having a form, shape and construction similar to spacer assembly 60, known to those skilled in the art, is placed about the rearwardly facing perimeter surface of the neoprene strip 62 so that the rearward panel 44 is spaced a sufficient distance from the intermediate panel. A double sided adhesive tape may also be placed along the rearwardly facing surface of the spacer assembly 64 to seal between the spacer assembly 64 and the rearward panel 44.

The rearward panel 44 is placed over the spacer assembly 64 and against a registration guide or index points positioned on the same two sides as those for the forward panel so that the rearward panel and forward panel are square relative to each other. Sealant 66 may then be injected or gunned into the space between the forward and rearward panels, after which the door frame elements may then be assembled about the perimeter to engage the sealant, as described more fully below.

The registration guides or index keys are preferably used as an assembly or registration arrangement so that the glass unit can be quickly and efficiently assembled while maintaining the glass panels and spacer assemblies in proper position. The registration guides are preferably positioned and formed in such a way that sealant can be injected in the proper location around the glass unit without affecting proper registration and positioning of the glass panels and spacer assemblies. While it is not believed to be necessary, clamps or bindings can be applied to the glass unit once assembled in order to maintain the glass unit in proper registration. It should be noted that a preliminary or primary sealant can be applied around the spacers to provide a preliminary seal for the glass unit, which is allowed to set. Thereafter, additional sealant can be applied around the primary sealant, after which the frame elements are assembled, as described more fully below. This sequence would permit assembly of glass units, curing and stacking of the glass units until such time as the frames can be assembled and placed on the glass units.

In the preferred embodiments, four of the door rail elements (FIGS. 3 and 4) are assembled into a rectangular frame for the glass unit so that the door rail elements extend along all four sides of the glass panels. Each door rail element serves several functions, including providing a thermally stable and low thermal conductivity frame element. The door rail element also provides protection for the edges of the glass panels and a pleasing appearance for the perimeter and rear facing surfaces of the glass unit. The door rail element also provides insulation as a result of the hollow configuration of part of the frame. The door frame element also serves to anchor the frame in sealant injected around the spacer assemblies as well as the interior surfaces of the glass panels. Additionally, the configuration of the door rail element permits flexibility in aligning the door rail elements relative to the glass panels, such as the rearward-most glass panel 44. For example, the configuration of the door rail element uses the forward portion of the door rail element in conjunction with the two perimeter edges of the forward glass pane for alignment, allowing a certain amount of mis-alignment between the intermediate and/or rearward glass panels and the door rail elements. Therefore, where the rearward glass panel is not perfectly aligned or square with the forward glass panel, for example to provide a feed through for heater wires into the hinge side of the hollow in the frame, or where the rearward glass panel is not cut or shaped precisely square, the door rail element can still accommodate the glass unit while still having the forward glass panel and the frame rail elements aligned and giving a square appearance. Similarly, door assembly no longer requires close attention to alignment of both the forward glass pane and the rearward glass pane, but primarily alignment only of the forward glass pane.

Each door rail element preferably includes an external perimeter wall 68 extending from a rear most corner 70 adjacent an edge 72 of the rearward most panel 44 to a forward most corner 74 adjacent an edge 76 of the forward glass panel. The external surface 78 of the perimeter wall is preferably substantially straight and flat in the front to back dimensions and in the longitudinal dimension. The corners 70 and 74 are preferably formed to be rounded to minimize chipping, flaking or other deterioration of the edges of the perimeter wall. When the door rail element is formed as a pultrusion, those skilled in the art will be able to select the appropriate curvature at the corners 70 and 74 for the desired application.

The external perimeter wall 68 terminates after the forward corner 74 at a relatively small forward facing surface 80, defining the forward-most extent of the door rail element, and the forward-most extent of the refrigerator door, in the preferred embodiment. The forward facing surface 80 curves inwardly and terminates at an inwardly facing surface 82 which is preferably flat for serving as a back stop or support surface for a rubber, neoprene, soft PVC or other soft and resilient insert 84. Insert 84 (FIG. 4) serves as a registration line or surface and cushion, as well as a protector strip, for the perimeter edge of the forward glass panel 42. The resilient insert 84 extends into an area and is retained by a first longitudinally extending pocket 86 at the inward-most end of the surface 82. The pocket 86 is preferably substantially oval-shaped with a flat side having a dimension larger than the span of the opening in the pocket 86. The edges 87A and 87B of the opening are preferably rounded as would be understood by those skilled in the art for a pultruded profile.

Figure 6:
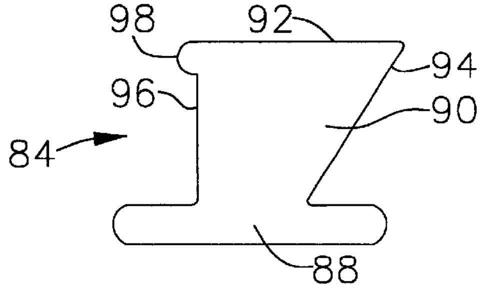
FIG. 6 is an end view of a soft rubber or other insert for a door rail element of the present inventions.

The insert 84 (FIG. 6) preferably includes a base or foot 88 to conform to the shape of the pocket 86 and a body 90 having an exposed outer surface 92 and a slanted wall 94. The slanted wall 94 engages and cushions the outer perimeter edge of the forward glass panel to protect the glass edge and also to create a sealing pressure between the insert 84 and the glass panel. The wall 94 extends in a direction toward the forward glass panel and terminates at the outer surface 92. The insert 84 also includes an outwardly-facing surface 96 for bearing against and contacting the surface 82. The junction between the surface 96 and the surface 92 may include a projection 98 for further increasing the sealing pressure developed in the insert 84 between the surface 82 and the perimeter edge of the glass panel. The projection 98 can also be omitted.

The edge 87B forms one end of a longitudinally extending flat surface 100 in the forward facing side of the door rail element 68. The surface 100 serves as a support and back stop for the adjacent surface of the forward panel 42. Where the forward panel 42 includes a mask or frit, part of the mask would obscure the surface 100 from view. The surface 100 extends inwardly along the door rail element from edge 87B to an inward corner 102, forming the inward edge of the surface 100.

Figure 7:
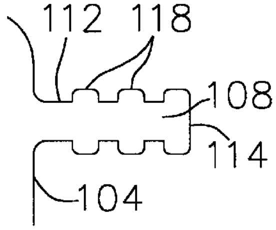
FIG. 7 is a partial side elevation view of a projection included on a frame rail element according to one aspect of the present inventions.

The inward corner 102 forms the forward-most corner of an inwardly facing wall 104, which terminates at a corner 106 opposite the corner 102. The wall 104 forms a surface for contacting the sealant 66 and provides a surface to which the sealant 66 can adhere or bond. The wall 104 preferably includes at least one and preferably first and second roughened projections 108 and 110. The projections helped to anchor the frame rail elements in the sealant 66 and provide engagement surfaces between the door rail element and the sealant 66. Each projection preferably extends from the wall 104 by means of a post 112 (FIG. 7) terminating at a flat surface 114 preferably falling along a plane defined by a perimeter edge 116 of the intermediate glass panel 50. The circumferential surface of the post 112 preferably includes circumferential ridges, peaks or other protrusions 118 for further engaging and anchoring with the sealant 66. Preferably, the projections 108 and 110 extend from the wall 104 at a location opposite the respective spacer assemblies 60 and 64. While the projections 108 and 110 can be bonded or otherwise attached to the wall 104, they are preferably pultruded as part of the door rail element 68. The projections 108 and 110 also extend linearly along the wall 104 the full extent, preferably, of the door rail element.

The corner 106 also defines one edge of a relatively long or deep U-shaped channel or groove 120 for accepting a line of sealant 122 and the edge portion of the rearward-most glass panel 44 in the door rail element. The groove 120 is defined by a first wall 124 extending from the corner 106 to a base wall 126 and is opposite a second wall 128 extending from the base wall 126 to its inner most edge 130, for defining the channel 120. The channel 120, with or without sealant 122, provides the tolerance or a buffer to accommodate differences in dimension, shape, cut or positioning of the rearward-most glass panel 44. The use of the groove 120 in the door rail element allows proper positioning of the door rails and glass unit relative to the front glass panel 42, and does not require close registration between the rearward glass panel 44 and the door rail elements. The groove 120 permits flexibility in alignment between the door rail elements and the glass unit. By placing sealant 122 in the bottom of the groove, preferably against the base wall 126, the sealant can act as a cushion as well as to hold the rearward glass panel 44 in place.

Figure 8:
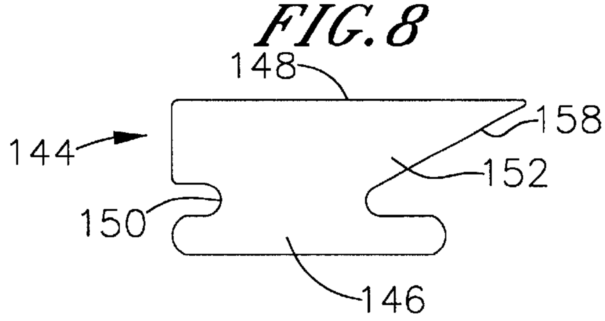
FIG. 8 is a end view of a sealing element for use with a frame rail for contacting a rear glass panel of a glass unit.
Figure 9:
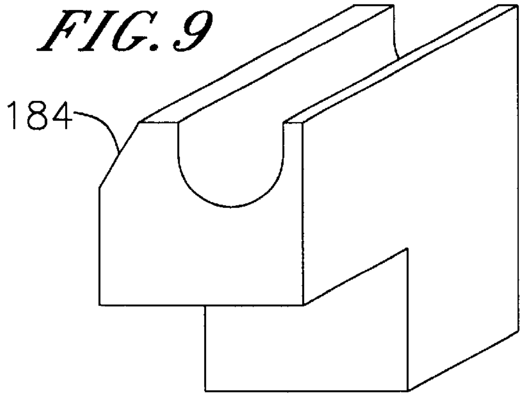
FIG. 9 is a perspective view of a corner key for use with the present inventions.
Figure 10:
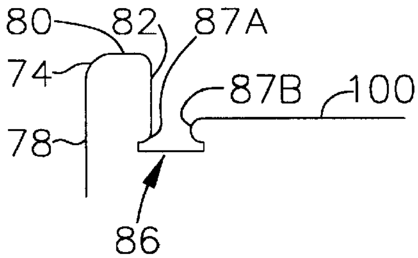
FIG. 10 is a partial cut away view of a portion of a frame element showing one feature of the present inventions.

The edge 130 extends inwardly and rearwardly along a slanted or sloped surface 132 to a forwardly facing wall 134. The wall 128, wall 132 and wall 134 define part of a rearward wall portion 136 which extends inwardly over the rearwardly facing surface of the rear glass panel 44. The wall 134 extends to an inner-most edge 138 and includes a seal pocket 140 near the edge 138 for accepting a sealing element 144 extending longitudinally with each door rail element. Each sealing element 144 seals against the adjacent rearward facing surface of the rearward glass panel 44 to minimize the possibility of moisture, air, food particles and the like passing the sealing element 144. This sealing element 144 (FIG. 8) preferably includes a foot or base 146, a contact surface 148 for contacting the glass panel, and an intermediate portion 150 for connecting the foot 146 to a pad 152 extending between the portion 150 and the contact surface 148. The foot 146 engages the complementarily-shaped pocket 140, which preferably has a flat sided oval shape having a side dimension greater than the span of the opening between edges 154 and 156 of the pocket 140. The intermediate portion 150 preferably engages and contacts the edges 154 and 156 to hold the sealing element 144 in place and to provide a suitable seal. The sealing element 144 preferably includes a slanted surface 158 for providing a smooth transition between the rear wall portion 136 and the rear glass panel 44.

The rear wall portion 136 includes a rearwardly facing surface 160 extending from the wall 138 to the corner 70. The rear wall 132 also preferably includes a gasket pocket 162 including a base wall 164 forming a flat-sided oval having a side dimension also greater than the span between the edges 166 and 168 forming the opening to the gasket pocket 162. The gasket pocket 162 accepts and holds a gasket 38 for sealing between the door and the frame of the refrigerated display case. The gasket 38 is preferably a conventional gasket. The rear wall portion 136 may also include a heater wire groove 172 if desired.

The door rail element (FIGS. 3 and 4) also preferably includes a closed hollow 174 defined by interior surfaces of the perimeter wall 68, wall 100, wall 104 and wall 124. Wall 176, base wall 126, and wall 82 form the inner most surfaces of the perimeter wall 68. Wall 178 forms the inside surface of wall 100, and wall 180 forms the inside surface of wall 104. Wall 182 forms the inside for surface of wall 124. Walls 176, 178, 180 and 182 define a preferably closed hollow for accepting corner keys at respective ends of each door rail element (shown in phantom in FIG. 4 as 184). There are four corner keys used to hold the four linear door rail elements together in a frame about the edges of the glass panels, as is conventionally known. Two of corner keys along one vertical side will accept, retain and support hinge elements and/or closure mechanisms, shown schematically in phantom at 186 (FIG. 4), for a vertical swing door. The hollow 174 provides a dead air space between the forward and rearward glass panels to provide thermal insulation between the cold portion of the display case and ambient air. The hollow also provides an open area for receiving such components as hinge pins, the corner keys, mounting elements or fasteners for door hold opens, shock absorbers, and the like.

The preferred door rail elements can be used on all four sides of the swing door or any other display case door. A different rail element does not need to be selected as a function of whether not the rail will be used for mounting a handle, hinge support or the like. The door rail element also serves combined functions of structural support, engagement of sealant, pleasing appearance, protection of glass edges, and, in the preferred embodiment, thermal insulation where the door rail elements are formed from pultruded material. Once assembled as a door, the door rail elements also serve to properly orient and position the forward glass pane by positioning the inserts 84 square about the edges of the glass panel 42, without regard to the shape or orientation of the rearward glass panel 44. Moreover, with the door rail elements formed from glass fiber mats, rovings and thermosetting resin, the door rail element material is proportionally closer to the characteristics of the glass panels, and therefore, tend to react in a manner closer to that of the glass than would aluminum door rail elements. For example, the pultruded door rail elements would tend to expand or contract, or conduct heat, in the adverse environment of refrigerated display cases more similar to glass than would aluminum.

The door rail elements can be placed about the peripheral edges of the glass panels in a manner similar to that used with conventional aluminum door rails. However, it is believed that the door rail elements can be most effectively assembled by joining adjacent pairs of door rail elements and fastening the corner keys joining the door rail element pairs. The additional corner keys can then be mounted and fastened into an end of one each of the joined pairs of door rail elements, followed by joining the two pairs of door rail elements about the edges of the glass panels. Alternatively, three adjacent door rail elements can be assembled with their common corner keys and the corner keys fastened to their respective door rail elements. The two remaining corner keys can then be mounted and fastened to the remaining door rail element, and the three elements and the remaining forth element assembled and the corner keys fastened about the edges of the glass panels. As the door rail element assemblies are moved closer to the glass panel edges, the projections 108 and 110 contact and press into the sealant 66. Additionally, the edge 72 of the rearward glass panel 44 preferably contacts and engages additional sealant 122 placed in the bottom of groove 120. As the peripheral edges of the forward glass panel 42 engages and presses against the insert 84, the door rail elements will automatically align and register with the edges of the forward glass panel 42. As the door rail elements approach closer to the edges of the glass panels, the inserts 84 around the door rail elements will compress and the glass panels will be under slight compression. A suitable lubricant such as soap could be applied to the peripheral surfaces of the rearward glass pane to make assembly easier. Fastening the corner keys and the door elements while the inserts 84 are compressed enhances the seal created between the door rail elements and the edges and sides of the glass panels, as well as the spacers. After the door rail elements are assembled about the edges of glass panels, other hardware can be applied. Alternatively, various hardware such as a door handle, mounting elements for hold-opens, and the like can be mounted prior to assembly of the door rail elements.

The hinge pin 188 (FIG. 5) can be inserted into a corner key and a torque mechanism, shown schematically as 186 in FIG. 4, can be inserted into its corresponding corner key. A fastening plate 190 (FIG. 5) is pre-installed on the upper door rail and held in place by blind fasteners such as blind rivets 191, and accepts a door hold-open fastener 192. The door hold-open fastener anchors one end of a door hold-open 194, the other end of which is mounted to the door frame through a fastener 196 to a frame mounting plate 198, which in turn is held in placed by blind fasteners 200. The door hold-open fastening plate 190 sandwiches the side face between the plate and the blind fasteners, and the mounting plate and fastener do not pass completely through the hollow 174 in the door rail element. Therefore, mounting and sealing of the glass unit within the door rails is not compromised by any adjacent hardware in the door.

Figure 11:
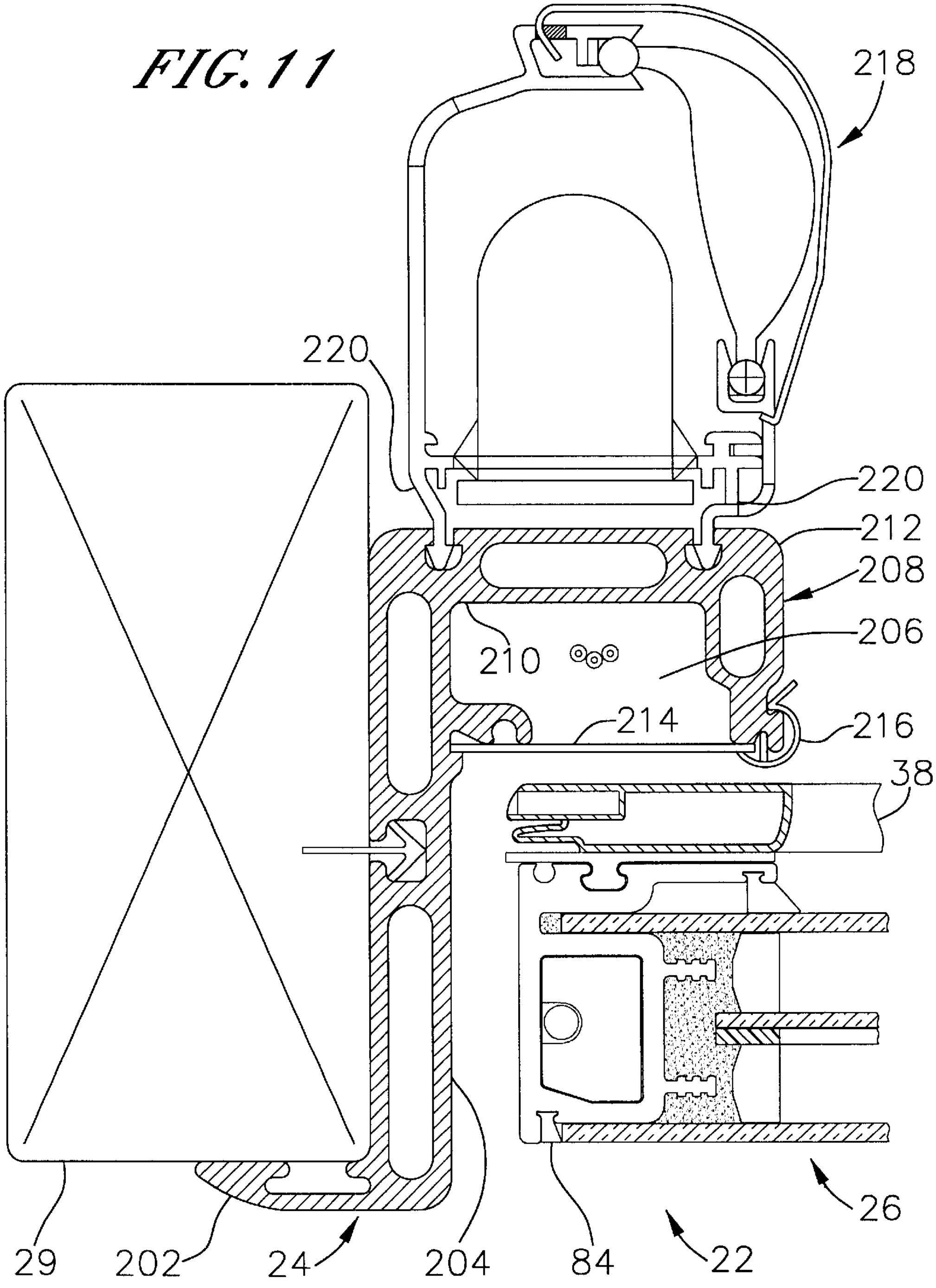
FIG. 11 is a horizontal cross section of a door and frame assembly in accordance with a further aspect of the present inventions.

The door described herein can be used with a wide variety of surrounding frames and display case configurations. One type of frame 24 (FIG. 11) includes a decorator strip 202, and a first leg 204. The first leg covers the exposed edge of the case wall and extends into the case sufficiently to allow placement of the door in an inset or recessed configuration, and also mounts various hardware for supporting the door. The side wall 204 also serves to form one wall of a recessed cavity or raceway 206, which will contain wiring, ballast equipment or other hardware. A second leg or transverse wall 208 forms the structural backstop for closing and sealing the door against the frame rail, and forms second and third sides 210 and 212, respectively of the raceway 208. The fourth side of the raceway is formed by a removable contact plate 214 held in place by a captivating groove on one side and a zipper strip or contact plate clip 216 on the other side. A lighting assembly 218 may be mounted to the third leg through mounting posts 220.

A handle (not shown) can be mounted to the door for opening and closing the door. The handle can be attached through fasteners such as screws or rivets through wall 78 in the door rail element. The handle can include a plate passing between the insert 84 and the wall 82 and adjacent the inside surface of wall 176. A support block may be placed on the opposite side of the handle plate so that the handle plate is sandwiched between the wall 176 and the block. Other mounting configurations are possible.

The door rail element is preferably made as a fiberglass-reinforced thermosetting resin pultrusion, having a profile described herein. In the preferred embodiment, the profile has dimensions such as those described below. The pultrusion for the door rail can be made by Omega Pultrusions, Inc., using continuous strand fiberglass mat from such suppliers as Owens-Corning, MicroFiber, PPG or Certainteed. The surface veil and continuous strand fiberglass rovings can be formed in conventional manner as would be known to those skilled in the art. Fiberglass rovings can also be obtained from such companies as PPG and the others listed. Polyester resins can be obtained from Owens-Corning, as well as the other companies listed, and polyester remay can likewise be obtained from those companies.

These embodiments of the frame rail elements described provide flexibility in alignment of not only the glass panels with respect to each other, but also the glass panels relative to the frame rail elements. It is no longer as important as it once was to ensure alignment of the glass panels, thereby providing more flexibility in assembly. Moreover, alignment or registration of the forward glass panel with the frame rail elements is made easier by the present design. The glass panels and glass unit as a whole no longer need to be perfectly square. The insert adjacent the forward glass panel provides alignment and absorbs impact to the door rails for protecting the forward glass panel. Additionally, any glass units that use a frit are now easier to install without misalignment because the frit it is placed on the forward glass panel and the forward glass panel is easily aligned with the frame. Therefore, the frame, which would be a reference point for the frit, would be aligned with the borders of the frit. An additional benefit derives from the use of sealant in the groove or pocket for the rearward glass panel, thereby permitting easier alignment of the glass unit and serving as a shock absorber for the rear glass panel.

This design also reduces the number of parts for assembly, the timer acquired for assembly as well as the average manufacturing space for acquired per door for assembly. The design combines several parts in some previous doors into a combined rail element, which also helps to make the door easier to assemble as well as faster and less time-consuming to produce a finished door. Moreover, the door can use preexisting components such that his hinge elements and other hardware. The door can be produced all at once or in parts.

Making the door rail elements by a pultrusion from fiberglass embedded thermosetting plastic provides a strong and thermally stable door rail element and door frame. Because it has a large percentage of glass embedded in the it, the door rail is more compatible material-wise with the glass units than was the case with conventional doors. Therefore, the stability and thermal characteristics of doors made from these door rail elements is enhanced. Additionally, the hollow portion of the frame extending from the external wall to a point beyond the perimeter of the forward and rearward glass panels provides a measure of thermal insulation not found in most conventional doors.

Figure 3:
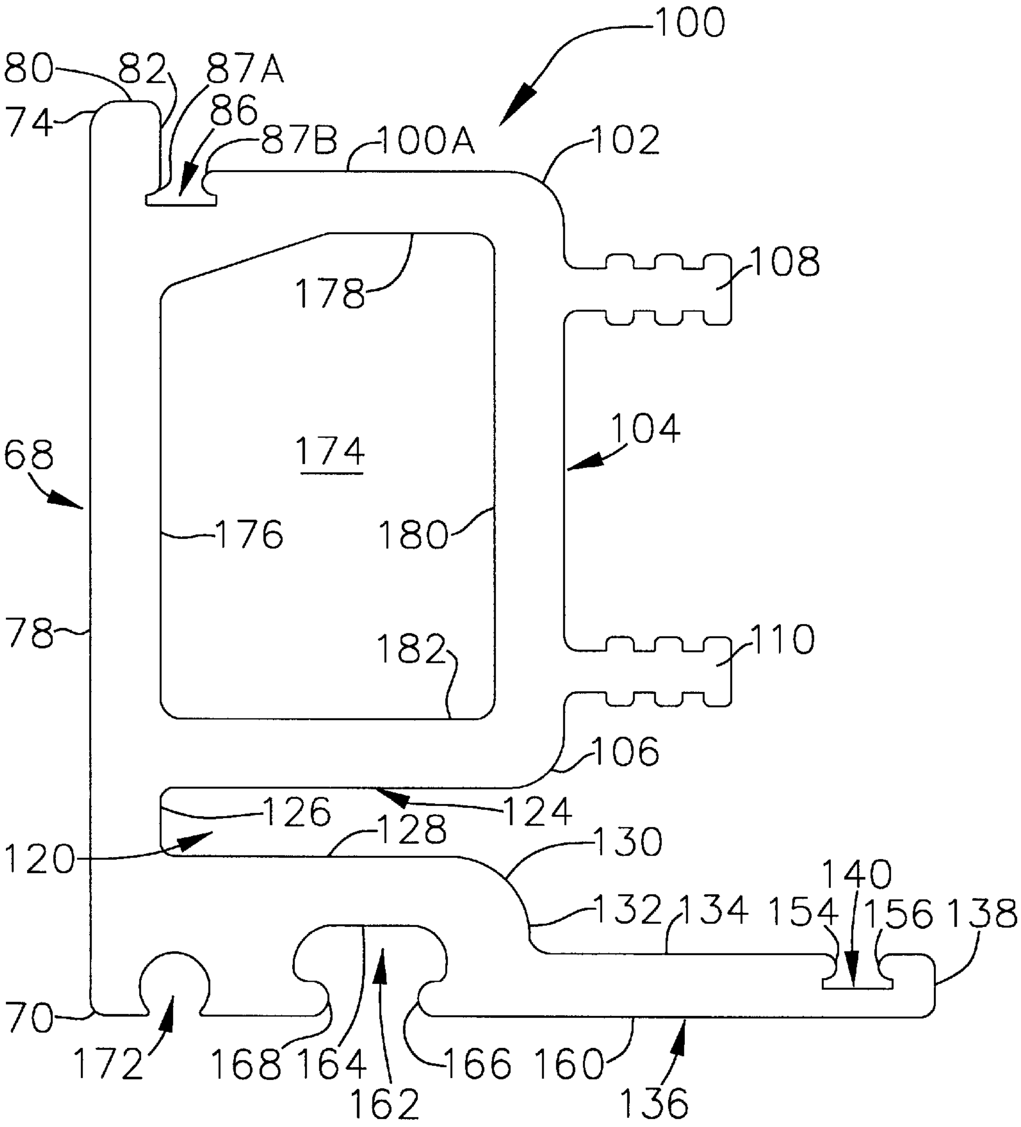
FIG. 3 is a cross sectional view of a profile of a door rail element in accordance with one aspect of the present inventions.

Exemplary dimensions for the door rail element, corresponding to a three-panel door, include a 0.125 in. wall thickness for the walls 78, 100, 104 and 124 (FIG. 3). The thickness of the wall 78 at the location of wall 82 may be 0.120 in. The thickness of the wall 134 between the slanted wall 132 and the end surface 138 may be 0.166 in. The thickness of the wall between wall 128 and wall 160 may be 0.285 in. The spacing between the outside surfaces of wall 100 and wall 124 may be 1.135 in., and the center to center distance between the posts 108 and 110 may be 0.686 in. The largest distance between walls 178 and 182 may be 0.885 in., and between walls 176 and 180 may be 0.595 in. The distance between wall 80 an 160 may be 1.685 in. The distance between wall 80 and wall 100 may be 0.125 in., and the distance between walls 124 and 128 may be 0.140 in. The distance from wall 100 to the center of the projection 108 may be 0.225 in., and the height from wall 104 to the end of each projection 108 and 10 may be 0.3120 in. The outside distance from wall 68 to the outside surface of wall 104 may be 0.845 in. and the distance from the outside of wall 68 to the end surface 138 may be 1.500 in. The distance from the wall 80 to the bottom of the pocket 86 may be 0.215 in., and the width of the pockets 86 and 140 may be 0.180 in. The width of the pocket 162 may be 0.300 in. The width of the edges 87B, 154, 156, 166 and 168 may be 0.060 in. The dimensions of the lines 118 (FIG. 7) may be 0.040 in., and the spacing between them may be 0.080 in.

Although the present inventions have been described in terms of the preferred embodiments above, the described embodiments of the invention are only considered to be preferred and illustrative of the inventive concept; the scope of the invention is not to be limited or restricted to such embodiments. Various and other numerous arrangements and modifications may be devised without departing from the spirit and scope of the inventions. Accordingly, the present invention is not limited to those embodiments precisely shown and described in the specification. It is intended that the scope of the present inventions extends to all such modifications and/or additions and that the scope of the present inventions is limited solely by the claims set forth below.

What is claimed is:

1. A method of manufacturing a refrigerator door, the method comprising the steps of:

assembling a glass unit including first and second glass panels separated by at least one spacer assembly;

applying sealant between the first and second glass panels and to the at least one spacer assembly;

applying at least one frame rail element having a groove for accepting a glass panel to at least one side of the glass unit;

pressing part of the at least one frame rail element to a peripheral edge of the first glass panel; and inserting the second glass panel into the groove so that the second glass panel is approximately centered in the groove relative to the sides of the groove.

2. The method of claim 1 further comprising the step of applying a sealant into the groove.

3. The method of claim 1 wherein the step of assembling a glass unit includes the step of applying a cushion strip to one of the glass panels.

4. The method of claim 3 wherein the step of assembling a glass unit includes the step of placing a spacer assembly between the cushion strip and an adjacent glass panel.

5. The method of claim 1 wherein the step of assembling a glass unit includes the step of assembling a glass unit having first, second and intermediate glass panels and further includes the step of applying a cushion and seal strip to the intermediate glass panel, and the step of placing a spacer assembly between the seal strip and one of the first and second glass panels, and wherein the step of applying a sealant includes the step of applying a sealant between the first and second glass panels and in contact with the seal strip and spacer assembly.

6. The method of claim 1 wherein the step of pressing part of at least one frame element includes the step of pressing projections on at least one frame element into a sealant between the first and second glass panels.

7. The method of claim 1 wherein the step of assembling a glass unit includes the step of placing a first surface of the first glass panel facing downward on a support surface, further comprising the step of joining adjacent pairs of frame rail elements, and wherein the step of applying at least one frame rail element includes the step of inserting parts of the adjacent pairs of frame rail elements between the first and second glass panels while guiding the groove about an edge of the second glass panel.

8. The method of claim 7 further comprising the steps of assembling two sets of adjacent pairs of frame rail elements, each pair of frame elements having respective free ends, and joining the sets of frame rail elements to form a rectangular frame about the sides of the glass unit and at least partly between the first and second glass panels.

9. The method of claim 7 further comprising the step of applying a sealant into a groove in each frame rail element.

10. The method of claim 8 wherein the step of joining includes the step of fastening at least one frame rail element to a corner key.

11. The method of claim 8 wherein the step of joining includes the step of positioning each frame rail element so that a portion of the second glass panel is inserted into a groove in each frame rail element.

12. The method of claim 11 further comprising the step of applying a door gasket strip to each frame rail element.

13. The method of claim 10 wherein the steps of assembling and joining include the steps of fastening ends of adjacent frame rail elements to corner keys.

14. The method of claim 1 further comprising the step of fastening a plate into a door rail element.

15. The method of claim 1 further comprising the step of applying an insert in the frame rail element so as to be adjacent the first glass panel after the door is assembled.

16. The method of claim 1 wherein the step of assembling a glass unit includes the step of placing the first glass panel on a support surface, placing the first spacer assembly on the first glass panel, placing an intermediate glass panel on the spacer assembly, placing a second spacer assembly on the intermediate glass panel and placing the second glass panel on the second spacer assembly, and wherein the step of applying sealant includes the step of applying sealant about the first spacer assembly, the intermediate glass panel and the second spacer assembly.

17. The method of claim 16 further comprising the step of applying sealant to the groove and positioning a frame rail element so that an edge of the second glass panel is inserted into the groove.

18. A method of manufacturing a refrigerator door, the method comprising the steps of:

assembling a glass unit including first, second and intermediate glass panels, so that the first and intermediate glass panels are adjacent each other and so that the second and intermediate glass panels are adjacent each other and so that the first and intermediate glass panels are separated by a first spacer assembly and the second and intermediate glass panels are separated by a second spacer assembly;

applying a sealant between the first and second glass panels so as to seal the space between the first and second glass panels adjacent the first spacer assembly and the second spacer assembly;

pressing first, second, third and fourth frame rail elements into the sealant and fastening at least one corner key to adjacent frame rail elements; and positioning at least one frame rail element so as to approximately center at least one portion of the second glass panel into a groove in the frame rail element.

* * * * *